Jan. 18, 1955  W. D. BENSINGER  2,699,763
INTERNAL-COMBUSTION ENGINE
Filed Sept. 27, 1949
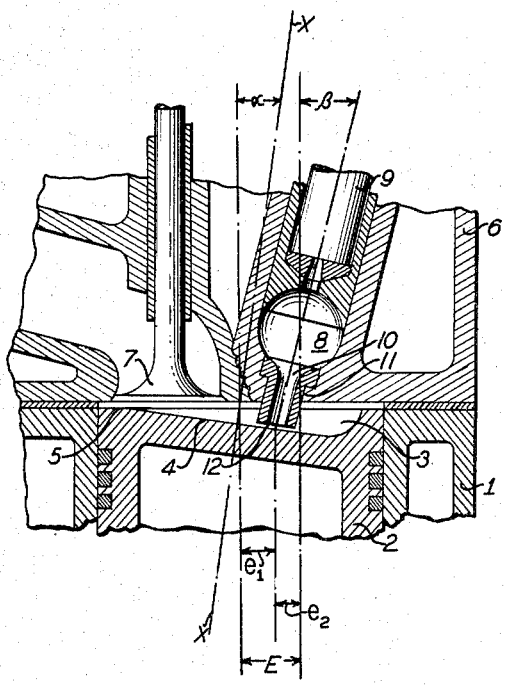
INVENTOR
*WOLF DIETER BENSINGER*
BY *Haseltine Lake & Co.,*
AGENTS

United States Patent Office 2,699,763
Patented Jan. 18, 1955

2,699,763

INTERNAL-COMBUSTION ENGINE

Wolf Dieter Bensinger, Muhlacker (Wurttemberg), Germany, assignor to Daimler-Benz Aktiengesellschaft, Stuttgart-Unterturkheim, Germany Application September 27, 1949, Serial No. 118,092

Claims priority, application Germany October 1, 1948

3 Claims. (Cl. 123—32)

This invention relates to an internal combustion engine, and has particular reference to a diesel engine of the antechamber or precombustion chamber type.

It is a primary object of the invention to provide means which ensure an optimum distribution of the fuel, more particularly of the contents of the antechamber or precombustion chamber, in the compression chamber or main combustion chamber and simultaneously to provide optimum spatial and thermal conditions.

With this object in view, I provide an appropriate arrangement of the compression chamber, injection device or antechamber and connecting channel between the antechamber and the main combustion chamber, moreover a suitable design of the piston head which is adapted to this arrangement. One feature of my invention in this connection refers to an advantageous arrangement of the precombustion chamber in relation to the main combustion chamber formed by a trough or tray in the piston head, and of a communicating channel connecting these two chambers. Another feature of my invention is mainly based on an arrangement in which the piston head comes so close to the mouth of the injection device or of the connecting channel between the antechamber and the main combustion chamber, in the dead-center position of the piston ending the compression stroke, that only a narrow gap is left which preferably is substantially annular. The most favourable results are attained in this case if the fuel or the antechamber jet is directed vertically or nearly vertically against the piston head, i. e., advantageously as centrally as possible to the main combustion chamber, so that a substantially uniform distribution of the contents of the antechamber in the main combustion chamber is ensured. On the other hand the injection device or the antechamber, respectively, is appropriately arranged eccentrically to the cylinder axis with such an amount of eccentricity that sufficiently large valves and cooling chambers can be provided in the cylinder head.

In order to combine these two requirements, according to a further feature of the invention the piston head is inclined in relation to a plane perpendicularly to the cylinder axis, the injection device or the connecting channel between the antechamber and the main combustion chamber simultaneously being arranged in such a direction that its axis terminates in the main combustion chamber perpendicularly or at a steep angle to the piston head. The mouth of the injection device, more particularly of the connecting channel in this case is advantageously disposed eccentrically to the cylinder axis towards the lower side of the piston head. The main combustion chamber is preferably formed by a trough or depression of the piston which is deepened towards one side, and whose inclined bottom, e. g., forms the annular passage cross section together with the mouth of the connecting channel.

By the said arrangement and design of the piston head it is primarily attained that the injection device or the antechamber and the connecting channel in case of an equally steep arrangement in relation to the piston head can be given a larger inclination with respect to the cylinder axis. Moreover, if the mouth of the channel is spaced at an equal distance from the cylinder axis, the antechamber can be arranged with a larger degree of eccentricity with respect to the cylinder axis. Furthermore, the center of gravity of the main combustion chamber and so the mass of the air for combustion in the main combustion chamber can be displaced towards the side of the antechamber or of the exit of the channel. Thus it is possible, moreover, additionally to displace eccentrically also the exit of the connecting channel in a manner which is favorable for the distribution of the contents of the antechamber, e. g., in such a manner that the axis of the connecting channel intersects approximately with the center of gravity of the non-symmetrical main combustion chamber. The axis of the connecting channel or of the antechamber in this case may extend vertically to the piston head or form therewith an angle which is slightly different from 90°, in such a manner that the distance of the antechamber from the cylinder axis is further enlarged. This last-mentioned arrangement moreover offers the advantage that the contents of the antechamber is blown into the main combustion chamber to a somewhat increased degree on the side of the main combustion chamber opposed to the antechamber, thus enriching also the more remote parts thereof with fuel without an insufficient supply of fuel to the adjacent parts of the main combustion chamber as a result of the steep arrangement of the channel. The trough forming the main combustion chamber in this case passes over to the border of the piston head towards the side opposite the antechamber advantageously in a shallow or substantially shallow or level form.

The invention will be better understood by reference to the following detailed description in connection with the accompanying drawing showing by way of example and purely schematically one embodiment of the invention, in an axial section.

In the drawing, a piston 2 slides in the cylinder head 1 of an internal combustion engine, the piston head forming an inclined trough or tray 3 which is preferably shaped so that it can be produced by a milling cutter rotating about the axis X—X and being inclined by the angle α. The bottom 4 of the trough is substantially plane and passes out in a level form into the border of the piston 5 at its higher side. In the cylinder head 6 is provided, adjacent to each pair of admission and exhaust valves 7, an antechamber 8 into which the fuel is injected through the injection nozzle 9 and which communicates with the main combustion chamber through a connecting channel 10 arranged axially to the nozzle. The channel is formed by an insert 11 projecting into the main combustion chamber to such an extent that an annular throttling gap 12 is formed, in the upper dead center position of the piston, between the mouth of the channel or the end surface of the insert on the one hand and the bottom of the trough of the piston on the other hand. The narrowest cross section thereof is, for instance, equal to the cross section of the connecting channel 10.

In accordance with the non-symmetrical configuration of the main combustion chamber the connecting channel 10 terminates with a certain eccentricity $e_1$ in the piston trough, for example, the axis of the antechamber or of the connecting channel may intersect approximately with the center of gravity of the main combustion chamber. Furthermore the antechamber with the injection nozzle and the connecting channel form an angle of inclination $\beta$ with the axis of the cylinder which is somewhat larger than the angle α, i. e., than the inclination of the botttom of the piston tray to the horizontal (or to a plane perpendicularly to the axis of the cylinder). Hereby results a further eccentricity $e_2$ of the center of the antechamber with respect to the center of the channel exit and a total eccentricity $E=e_1+e_2$ of the antechamber with respect to the cylinder axis. On the other hand, since $\beta$ is only a little larger than α, it is ensured that the charge or contents of the antechamber impinges steeply upon the piston head and is distributed towards all sides as uniformly as possible in the main combustion chamber. Advantageously, the axis of the connecting channel 10, which preferably coincides with the axis of the injection nozzle and of the antechamber, is disposed in such a way that its extension at least approximately intersects with the cylinder axis. The antechamber, which is advantageously globular in shape, is arranged in such a manner that it is located, in a plan view, within the diameter of the cylinder. Such an eccentricity of the antechamber (corresponding in magnitude approximately to half the cylinder radius) is particularly advantageous, since it is on the one hand sufficiently large as to permit the provision of sufficiently large valves and cooling spaces in the cylinder head, with the optimum distance of the injection nozzle from the piston head, and on the other hand it keeps within the limits within which a uniform distribution of the charge of the antechamber in the main combustion chamber and so a minimum excess of air or a maximum output with minimum fuel consumption is possible.

What I claim is:

1. In an internal combustion engine, a cylinder providing a cylinder space, a piston reciprocating in said cylinder space, said piston having a working face defining a main combustion chamber and comprising a substantially plane annular margin and a recess surrounded by said margin including an end face inclined relatively to a plane perpendicular to the cylinder axis and extending on one side thereof substantially to the level of said annular margin, a cylinder head limiting said cylinder space and said main combustion chamber, a pre-chamber of relatively smaller volume than said main combustion chamber located inside said cylinder head and positioned eccentrically with respect to said cylinder axis, an injection nozzle opening into said pre-chamber, means providing a communicating passage between said pre-chamber and said cylinder space of substantially smaller cross-section than said pre-chamber and inclined relatively to said cylinder axis in the direction of said cylinder space, said communicating passage opening into said cylinder space eccentrically with respect to said cylinder axis, said cylinder head including a wall portion defining an opening for said means extending therethrough into said cylinder space to a point closely adjacent a central portion of said end face in said recess with said piston in dead center position terminating the compression stroke thereof, said central portion cooperating in said position with the end of said means providing said communicating passage to define only a relatively small annular gap opening centrally into said recess, the inclination of said communicating passage with respect to said cylinder axis being such that the axis of said communicating passage is at least substantially perpendicular to said central portion of the recess.

2. An internal combustion engine as claimed in claim 1, wherein the eccentricity of said communicating passage with respect to said cylinder axis is greater than the eccentricity of said piston recess and to the same side thereof.

3. An internal combustion engine as claimed in claim 1, wherein said end face extends straight to the level of said annular margin at the side of said cylinder axis opposite said pre-chamber.

References Cited in the file of this patent

UNITED STATES PATENTS

| | | |
|---|---|---|
| 2,148,505 | Rosen | Feb. 28, 1939 |
| 2,316,269 | Maruhn | Apr. 13, 1943 |
| 2,622,570 | Nallinger | Dec. 23, 1952 |

FOREIGN PATENTS

| | | |
|---|---|---|
| 741,540 | France | Feb. 13, 1933 |
| 877,369 | France | Sept. 1, 1942 |
| 369,826 | Italy | Mar. 31, 1939 |

OTHER REFERENCES

Serial No. 368,293 Von Mallinckrodt (A. P. C.), published May 11, 1943.